United States Patent
Shah et al.

(10) Patent No.: US 6,172,149 B1
(45) Date of Patent: Jan. 9, 2001

(54) ROSIN-FATTY ACID VINYLIC POLYMERS AS SIZING COMPOSITIONS

(75) Inventors: Rajnikant Shah; Stanley C. Adams, both of Mt. Pleasant, SC (US)

(73) Assignee: Westvaco Corporation, New York, NY (US)

( * ) Notice: Under 35 U.S.C. 154(b), the term of this patent shall be extended for 0 days.

(21) Appl. No.: 09/521,437

(22) Filed: Mar. 7, 2000

Related U.S. Application Data

(63) Continuation-in-part of application No. 09/172,567, filed on Oct. 14, 1998, now abandoned.
(51) Int. Cl.$^7$ .................................................. C08L 93/04
(52) U.S. Cl. ........................ 524/272; 524/270; 524/764; 524/773; 525/54.42; 526/216; 526/238.3
(58) Field of Search ..................... 524/270, 272, 524/274, 764, 773; 525/54.42; 526/238.3, 216

(56) References Cited

U.S. PATENT DOCUMENTS

| | | | |
|---|---|---|---|
| 3,480,578 | 11/1969 | Witt | 524/764 |
| 4,414,370 | 11/1983 | Hamielec et al. | 526/88 |
| 4,529,787 | 7/1985 | Schmidt et al. | 526/317 |
| 4,546,160 | 10/1985 | Brand et al. | 526/320 |
| 4,839,413 | 6/1989 | Kiehlbauch et al. | 524/460 |
| 5,216,064 | 6/1993 | Rivera et al. | 524/272 |

*Primary Examiner*—Peter A. Szekely
(74) *Attorney, Agent, or Firm*—Daniel B. Reece, IV; Terry B. McDaniel; Richard L. Schmalz

(57) ABSTRACT

This invention relates to novel rosin-fatty acid vinylic polymer compositions and the process for preparing them. In particular, the invention relates to novel rosin-fatty acid vinylic polymer compositions which exhibit properties that make them useful as surface sizing compositions for cellulosic materials.

15 Claims, No Drawings

ROSIN-FATTY ACID VINYLIC POLYMERS AS SIZING COMPOSITIONS

FIELD OF INVENTION

This application is a continuation-in-part of our commonly assigned, U.S. patent application Ser. No. 09/172,567, filed Oct. 14, 1998 now abandoned, entitled "Rosin-Fatty Acid Styrene-Acrylic Polymers as Sizing Compositions".

This invention relates to novel rosin-fatty acid vinylic polymer compositions and the process for preparing them. In particular, the invention relates to novel rosin-fatty acid vinylic polymer compositions which exhibit properties that make them useful as surface sizing compositions for cellulosic materials.

BACKGROUND OF THE INVENTION

Sizing is a term used in the papermaking art to describe processes which reduce the water absorbency of cellulosic materials such as sheets of paper. This is commonly accomplished by precipitating a nearly fully saponified rosin soap or a free rosin dispersion on the cellulosic fibers with alum to form aluminum resinate. The aluminum resinate coats the exposed surface to give it a hydrophobic character, thereby rendering the surface resistant to wicking by water, inks, and other polar liquids.

Rosin sizes are normally water soluble alkali soaps or a colloidially stabilized dispersions of rosin. A variety of polymeric rosin resin sizes have been developed to address specific coating needs. However, certain rosins are highly prone to crystallization. Crystal formation in such rosins tend to occur during the production of the rosin size, during size storage, or after the size has been diluted to a low solids level.

The traditional process for producing a polymeric resin is well-known (see generally U.S. Pat. Nos. 4,839,413 and 5,216,064, which is hereby incorporated by reference). Commonly a solution polymerization reaction is employed wherein a styrenic monomer and acrylic acid is mixed with a hydrocarbon solvent, a polymerization initiator, and a chain transfer agent. Upon completion of the reaction, the solution is stripped of the solvent to yield the polymer composition.

However, major problems exist with the traditional methods of producing these polymeric resins. For example, these methods require the use of environmentally adverse hydrocarbon solvents. Moreover, as these solvents are not usable or desirable in water-based ink or overprint formulations, the solvents must be stripped from the resulting acrylic polymers (thereby causing a yield loss). This stripping step also adds expense to the process due to both the loss of yield and the energy consumed in performing the stripping. Also, these methods must utilize chain transfer agents to regulate the molecular weight of the resulting resin.

Therefore, an object of this invention is to solve these major problems by disclosing a method of producing rosin-fatty acid vinylic polymer compositions which exhibit properties that make them useful for formulating surface sizing compositions for cellulosic materials.

Another object of this invention is to disclose rosin-fatty acid vinylic polymer surface sizing compositions.

SUMMARY OF THE INVENTION

The objects of this invention are met by via a method that employs rosin and fatty acid to act as solvents in the polymerization reaction of the acrylic monomers, thereby producing rosin-fatty acid vinylic polymer compositions which exhibit properties that make them useful as surface sizing compositions for cellulosic materials. As this method does not require the use of hydrocarbon solvents, the need for solvent stripping is eliminated. Also, the polymerization reaction can be conducted at higher temperatures (i.e., up to boiling point of fatty acid) than traditional solution polymer methods, thereby allowing the practitioner to utilize smaller amounts of free radical initiators. Furthermore, the practitioner is able to regulate molecular weight without the use of chain transfer agents, thereby both reducing costs and avoiding the production of unpleasant odors associated with such agents. Moreover, the fatty acid and rosin can function as a reactive diluent to impart flexibility to the surface sizing compositions.

DESCRIPTION OF THE PREFERRED EMBODIMENT

The rosin-fatty acid vinylic polymer surface sizing compositions are the products of the process of:

(A) reacting in an addition polymerization reaction:
  (1) about 20.0% to about 60.0% by total weight of the reactants of a fatty acid rosin mixture comprising:
    (a) about 10.0% to about 90.0% by total weight of the fatty acid rosin mixture of fatty acid, and
    (b) about 10.0% to about 90.0% by total weight of the fatty acid rosin mixture of rosin; and
  (2) about 40.0% to about 80.0% by total weight of the reactants of a monomer mixture comprising:
    (a) about 15.0% to about 45.0% by total weight of the monomer mixture of a member selected from the group consisting of acrylic acid, methacrylic acid, fumaric acid, maleic anhydride, and combinations thereof,
    (b) about 55.0% to about 85.0% by total weight of the monomer mixture of a member selected from the group consisting of vinylic monomers and combinations thereof,
    (c) about 0.5% to about 5.0% by total weight of the monomer mixture of a polymerization initiator,
    (d) up to about 4.0% by total weight of the monomer mixture of a chain transfer agent, and
    (e) up to about 30% by total weight of the monomer mixture of a hydrocarbon solvent, at a temperature in the range of about 135° C. to about 175° C. to produce a rosin-fatty vinylic polymer having a weight average molecular weight in the range of about 4,000 to about 12,000; and
(B) dispersing the rosin-fatty vinylic polymer in water; to produce the rosin-fatty acid vinylic polymer surface sizing composition.

Preferred rosin-fatty acid vinylic polymer surface sizing compositions are the products of the process of:

(A) reacting in an addition polymerization reaction:
  (1) about 20.0% to about 60.0% by total weight of the reactants of a fatty acid rosin mixture comprising:
    (a) about 20.0% to about 50.0% by total weight of the fatty acid mixture of fatty acid, and
    (b) about 50.0% to about 80.0% by total weight of the fatty acid mixture of rosin; and
  (2) about 40.0% to about 80.0% by total weight of the reactants of a monomer mixture comprising:
    (a) about 20.0% to about 25.0% by total weight of the monomer mixture of a member selected from the group consisting of acrylic acid, methacrylic acid, fumaric acid, maleic anhydride, and combinations thereof, (b) about 60.0% to about 70.0% by total weight of the monomer mixture of a member selected from the group consisting of vinylic monomers and combinations thereof, (c) about 1.0% to about 3.0% by total weight of the monomer mixture of a polymerization initiator, (d) about 0.5% to about 2.0% by total weight of the monomer mixture of a chain transfer agent, and (e) about 1.0% to about 4.0% by total weight of the monomer mixture of a hydrocarbon solvent, at a temperature in the range of about 135° C. to about 175° C. to produce a rosin-fatty vinylic polymer having a weight average molecular weight in the range of about 4,000 to about 12,000; and (B) dispersing the rosin-fatty vinylic polymer in water; to produce the rosin-fatty acid vinylic polymer surface sizing composition.

The addition polymerization reaction used to produce the rosin-fatty acid vinylic polymer is a melt polymerization reaction in which no water is employed. Reaction temperatures suitable for use in the present method are within the range of about 135° C. to about 175° C.; with the preferred temperatures being in the range of about 140° C. to about 170° C.

The rosin and fatty acid function as solvents in the polymerization reaction of the acrylic monomers. Additionally, while a portion of the fatty acid and the rosin component remains unreacted, some of the fatty acid and rosin becomes graft polymerized onto the acrylic. The resulting rosin-fatty acid vinylic polymers have a weight average molecular weight in the range of about 4,000 to about 12,000; with the preferred molecular weights being in the range of about 5,000 to about 11,000. These rosin-fatty acid vinylic polymer compositions have characteristics which differ from the traditional melt blends of flake acrylic fatty acid rosin. For example, the low molecular weights of the rosin-fatty acid vinylic polymers enable the polymers to be neutralized at high solid levels while maintaining low viscosities. The low molecular weight coupled with the polymer's high levels of functional carboxyl units permits the production of surface sizing compositions (i.e., aqueous dispersions of the vinylic polymers) which contain high amounts of functional polymers components while maintaining targeted viscosity levels for sizing application purposes. Accordingly, the present process permits one to both tailor the polymer to obtain the maximum advantages from its fatty acid/rosin components and to impart desired characteristics to the subsequent sizing compositions. Such rosin-fatty acid vinylic polymers are well-suited for use in formulating surface sizing compositions for cellulosic materials. The rosin-fatty acid vinylic polymer compositions may also be employed to produce other polymeric compositions, such as styrene emulsion polymer and copolymers, acrylic polymers and copolymers, vinyl acetate polymers and copolymers, and the like.

Fatty acids which are suitable for use in the present method include those fatty acids which contain a range of carbon atoms from about $C_{12}$ to about $C_{24}$; with the preferred range being from about $C_{16}$ to $C_{20}$. It is further preferred that the fatty acid be vegetable or tall oil based. It is most preferred that the fatty acid be tall oil based and contain from about 15% to about 18% conjugated double bonds.

It is preferred to add from about 20% to about 50% by total weight of the fatty acid rosin mixture of fatty acid.

Rosins which are suitable for use in the present method include wood rosin, tall oil rosin, gum rosin, and the like. The use of tall oil rosin is preferred. It is further preferred to add from about 50% to about 80% by total weight of the fatty acid rosin mixture of rosin.

It is preferred to add from about 20% to about 25% by total weight of the monomer mixture of acrylic acid, methacrylic acid, fumaric acid, maleic anhydride, and combinations thereof.

It is preferred to add from about 60% to about 70% by total weight of the monomer mixture of vinylic monomers. Suitable vinylic monomers include styrenic monomers, acrylic monomers, methacrylic monomers, and the like. It is preferred that the vinylic monomers be a mixture, preferably including at least one monoalkenyl aromatic monomer and at least one acrylic monomer. The monoalkenyl aromatic monomer to be employed includes, for example, alpha-methyl styrene, styrene, vinyl toluene, tertiary butyl styrene, ortho-chlorostyrene and mixtures thereof.

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylamrinoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Other suitable acrylic monomers include methacrylic acid derivatives such as: methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide and methacrolein.

Typical acrylate esters employed include methyl acrylate, ethyl acrylate, n-propyl acrylate, isopropyl acrylate, n-butyl acrylate, n-decyl acrylate, 2-ethylhexal acrylate, and the like.

Acrylic acid derivatives employed as the acrylic monomer include: acrylic acid and its salts, acrylonitrile, acrylamide, methyl alpha-chloroacrylate, methyl 2-cyanoacrylate, N-ethylacrylamide, N,N-diethylacrylamide, and acrolein.

The present invention method is also applied to the preparation of copolymers from mixtures of two or more acrylic monomers such as termonomers and tetramonomers. It is also contemplated that mixtures of at least one acrylic monomer and at least one non-acrylic ethylenic monomer may be polymerized with monoalkenyl aromatic monomers in accordance with the present method.

Suitable ethylenic monomers include vinyl pyridine, vinyl pyrrolidone, sodium crotonate, methyl crotonate, crotonic acid, maleic anhydride, and the like.

The type of polymerization initiator suitable for use in the present method is known in the art to depend upon the desired temperature for the reaction. Suitable initiators include, but are not limited to, the following: t-butyl peroxide, t-butyl peroxybenzoate, t-butyl peroctoate, cumene hydroperoxide, azobisisobutyronitrile, benzoyl peroxide, and combinations thereof. It is preferred to add from about 1.0% to about 3.0% by total weight of the monomer mixture of polymerization initiator.

Where desired, a chain transfer agent may be employed in the present method. Chain transfer agents which are suitable for use in the above reaction include, but are not limited to, the following: dodecyl mercaptan, mercaptoacetic acid, mercaptopropionic acid, octyl mercaptan, 2-mercaptoethanol, and combinations thereof. Where employed, it is preferred to use an amount of chain transfer agent in the range of from about 0.5% to about 2.0% by total weight of the monomer mixture of chain transfer agent.

Where desired, a hydrocarbon solvent may be employed in the present method. Suitable hydrocarbon solvents include aromatic solvents, aliphatic solvents, and combinations thereof. Where employed, it is preferred to use an amount of hydrocarbon solvent in the range of about 1.0% to about 4.0% by total weight of the monomer mixture.

Rosin-fatty acid vinylic polymer compositions which are suitable for use as surface sizing compositions for ink and overprint applications have an acid number in the range of about 50 to about 500; with the preferred range being about 50 to about 250.

It is preferred to employ a bulk polymerization process for the addition polymerization reaction. The residence time for such bulk processes is commonly in the range of about 3 hours to about 10 hours. However, where desired the addition polymerization reaction may be conducted via the use of a continuous stirred polymerization process. The residence time for such continuous processes is commonly in the range of about 90 minutes to about 6 hours; with the preferred residence time being in the range of about 2 hours to about 3 hours.

The rosin-fatty acid vinylic polymer compositions should be properly neutralized in order to disperse the polymer composition in water for application to the cellulosic materials. A sufficient amount of alum should also be employed to permit the formation of the proper aluminum resinate for the desired sizing purpose. The proper addition of such additives for specific applications are well-known to those skilled in the art.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A rosin-fatty acid vinylic polymer composition was prepared via the following method. A reactor vessel equipped with a thermometer, stirrer, monomer feed pump, and a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 1") was allowed to cool prior to being evaluated (see Table I below).

A solution which can be employed as a paper sizing composition may be prepared by mixing 46.4% (by total weight of the solution) of Polymer No. 1, 1.2% of a tall oil fatty acid potassium salt, 1.6% of a dicarboxylic rosin potassium salt, 0.8% of sodium chloride, 50% deionized water, and a neutralizing amount of potassium hydroxide in a blender. The resulting solution may be applied to cellulosic materials as a size to impart a hydrophobic character to the material.

EXAMPLE 2

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 2") was allowed to cool prior to being evaluated (see Table I below).

A solution which can be employed as a paper sizing composition may be prepared by mixing 47.6% (by total weight of the solution) of Polymer No. 2, 1.6% of a dicarboxylic rosin potassium salt, 0.8% of sodium chloride, 50% deionized water, and a neutralizing amount of potassium hydroxide in a blender.

EXAMPLE 3

A rosin-fatty acid vinylic polymer composition was prepared via the following method. A reactor vessel equipped with a thermometer, stirrer, monomer feed pump, a blanket nitrogen intake line was charged at room temperature with a mixture of 360 grams of L-5 Fatty Acid (a tall oil fatty acid composition commercially available from Westvaco Corporation) and 40 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 340 grams of styrene, 260 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 3") was allowed to cool prior to being evaluated (see Table I below).

A solution which can be employed as a paper sizing composition may be prepared by mixing 45.0% (by total weight of the solution) of Polymer No. 3, 1.9% of a tall oil fatty acid sodium salt, 2.3% of a dicarboxylic rosin sodium salt, 0.8% of sodium chloride, 50.0% deionized water, and a neutralizing amount of sodium hydroxide in a blender.

EXAMPLE 4

A rosin-fatty acid vinylic polymer composition was prepared via the following method. A reactor vessel equipped with a thermometer, stirrer, monomer feed pump, a blanket nitrogen intake line was charged at room temperature with a mixture of 360 grams of L-5 Fatty Acid (a tall oil fatty acid composition commercially available from Westvaco Corporation) and 40 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 28 grams of di-tert-butyl peroxide, and 28 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 4") was evaluated (see Table I below).

EXAMPLE 5

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380 grams of styrene, 220 grams of acrylic acid, 21 grams of di-tert-butyl peroxide, and 35 grams of cumene hydroperoxide. After the addition of Charge A was completed, the reaction mixture was held at 150° C. for an additional hour. At that time 4 grams of cunene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 5") was evaluated (see Table I below).

A solution which can be employed as a paper sizing composition may be prepared by mixing 52% (by total weight of the solution) of Polymer No. 5, 2% of a tall oil fatty acid sodium salt, 2% of a dicarboxylic rosin potassium salt, 1% of potassium chloride, 43% deionized water, and a neutralizing amount of potassium hydroxide in a blender.

EXAMPLE 6

A rosin-fatty acid vinylic polymer composition was prepared via the following method. A reactor vessel equipped with a thermometer, stirrer, monomer feed pump, a blanket nitrogen intake line was charged at room temperature with a mixture of 280 grams of L-5 Fatty Acid (a tall oil fatty acid composition commercially available from Westvaco Corporation) and 120 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420 grams of styrene, 180 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 6") was evaluated (see Table I below).

A solution which can be employed as a paper sizing composition may be prepared by mixing 44% (by total weight of the solution) of Polymer No. 6, 1.5% of a tall oil fatty acid potassium salt, 2% of a dicarboxylic rosin sodium salt, 0.5% of sodium chloride, 52% deionized water, and a neutralizing amount of sodium hydroxide in a blender.

EXAMPLE 7

A rosin-fatty acid vinylic polymer composition was prepared via the following method. A reactor vessel equipped with a thermometer, stirrer, monomer feed pump, a blanket nitrogen intake line was charged at room temperature with a mixture of 280 grams of L-5 Fatty Acid (a tall oil fatty acid composition commercially available from Westvaco Corporation) and 120 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 340 grams of styrene, 260 grams of acrylic acid, 14 grams of di-tert-butyl peroxide, and 42 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 7") was evaluated (see Table I below).

EXAMPLE 8

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation) and 200 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380 grams of styrene, 220 grams of acrylic acid, 8 grams of di-tert-butyl peroxide, and 8 grams of curnene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 8") was allowed to cool prior to being evaluated (see Table I below).

EXAMPLE 9

A rosin-fatty acid vinylic polymer composition was prepared via the following method. A reactor vessel equipped with a thermometer, stirrer, monomer feed pump, a blanket nitrogen intake line was charged at room temperature with a mixture of 240 grams of L-5 Fatty Acid (a tall oil fatty acid composition commercially available from Westvaco Corporation) and 160 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380 grams of styrene, 220 grams of acrylic acid, 7 grams of di-tert-butyl peroxide, and 20 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 9") was allowed to cool prior to being evaluated (see Table I below).

A solution which can be employed as a paper sizing composition may be prepared by mixing 50% (by total weight of the solution) of Polymer No. 9, 1.8% of a tall oil fatty acid potassium salt, 1.2% of a dicarboxylic rosin sodium salt, 1.0% of sodium chloride, 46% deionized water, and a neutralizing amount of potassium hydroxide in a blender. The resulting solution may be applied to cellulosic materials as a size to impart a hydrophobic character to the material.

TABLE I

Properties Of Rosin-Fatty Acid Vinylic Polymer Compositions

| Resin | MW[1] | Acid No. | Softening Pt (° C.) |
|---|---|---|---|
| Polymer 1 | 8,939 | 194 | 101 |
| Polymer 2 | 8,939 | 197 | 99 |

TABLE I-continued

Properties Of Rosin-Fatty Acid Vinylic Polymer Compositions

| Resin | MW[1] | Acid No. | Softening Pt (° C.) |
|---|---|---|---|
| Polymer 3 | 5,894 | 249 | 81 |
| Polymer 4 | 4,913 | 197 | 76 |
| Polymer 5 | 7,314 | 235 | 111 |
| Polymer 6 | 7,588 | 199 | 85 |
| Polymer 7 | 8,400 | 247 | 104 |
| Polymer 8 | 7,613 | 138 | 108 |
| Polymer 9 | 7,873 | 237 | 101 |
| H-2702[2] | 7,000 | 206 | 140 |
| H-2701[2] | 2,500 | 210 | 135 |
| H-2702[2] | 7,000 | 206 | 155 |
| M-101[3] | 7,000 | 204 | 134 |
| J-678[4] | 8,400 | 205 | 145 |
| J-682[4] | 1,500 | 243 | 105 |
| J-690[4] | 16,000 | 240 | 136 |
| C-1162[5] | 2,300 | 216 | 125 |

[1]Weight Average Molecular Weight.
[2]JONREZ H-2702 and H-2701 are acrylic resins commercially available from Westvaco Corporation.
[3]MOREZ M-101 is an acrylic resin commercially available from Morton International Inc.
[4]JONCRYL J-678, J-682, and J-690 are acrylic resins commercially available from S. C. Johnson and Son, Inc.
[5]CARBOSET C-1162 is an acrylic resin commercially available from B. F. Goodrich.

As shown by the data in Table I, the rosin-fatty acid vinylic polymer resins can be tailored to have chemical characteristics and properties similar to commercially available, commonly employed resins.

EXAMPLE 10

A rosin-fatty acid vinylic polymer composition was prepared via the following method. A reactor vessel equipped with a thermometer, stirrer, monomer feed pump, a blanket nitrogen intake line was charged at room temperature with a mixture of 475 grams of L-5 Fatty Acid (a tall oil fatty acid composition commercially available from Westvaco Corporation), 185 grams of Rosin SS (a tall oil rosin composition commercially available from Westvaco Corporation), 45 grams of toluene, and 0.6 grams of hypophosphoric acid. The mixture was heated under a nitrogen blanket to 150° C. and held at that temperature, whereupon Charge A was added, with stirring, over a three hour period. Charge A consisted of a mixture of 946 grams of styrene, 594 grams of acrylic acid, and 38.5 grams of di-tert-butyl peroxide. After the addition of Charge A was completed, the reaction mixture was held at 150° C. for an additional hour. At that time 4.4 grams of di-tert-butyl peroxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 10") was allowed to cool.

EXAMPLE 11

A rosin-fatty acid vinylic polymer composition was prepared via the following method. A reactor vessel equipped with a thermometer, stirrer, monomer feed pump, a blanket nitrogen intake line was charged at room temperature with a mixture of 450 grams of L-5 Fatty Acid (a tall oil fatty acid composition commercially available from Westvaco Corporation), 450 grams of Rosin SS (a tall oil rosin composition commercially available from Westvaco Corporation), and 1.5 grams of hypophosphoric acid. The mixture was heated under a nitrogen blanket to 150° C. and held at that temperature, whereupon Charge A was added, with stirring, over a three hour period. Charge A consisted of a mixture of 427.5 grams of styrene, 427.5 grams of (alpha) methyl styrene, 495.0 grams of acrylic acid, 16.0 grams of di-tert-butyl peroxide, and 95.0 grams of cumene hydroperoxide. After the addition of Charge A was completed, the reaction mixture was held at 150° C. for an additional hour. At that time 9.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 11") was allowed to cool.

EXAMPLE 12

A rosin-fatty acid vinylic polymer composition was prepared via the following method. A reactor vessel equipped with a thermometer, stirrer, monomer feed pump, a blanket nitrogen intake line was charged at room temperature with a mixture of 200 grams of L-5 Fatty Acid (a tall oil fatty acid composition commercially available from Westvaco Corporation), 200 grams of Rosin SS (a tall oil rosin composition commercially available from Westvaco Corporation), 30 grams of toluene, and 0.5 grams of hypophosphoric acid. The mixture was heated under a nitrogen blanket to 150° C. and held at that temperature, whereupon Charge A was added, with stirring, over a three hour period. Charge A consisted of a mixture of 340 grams of styrene, 260 grams of acrylic acid, 10 grams of di-tert-butyl peroxide, and 7 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer was allowed to cool.

EXAMPLE 13

A rosin-fatty acid vinylic polymer composition was prepared using a continuous stirred tank reactor. A resin pump continuously fed (at a rate of 7.5 grams per minute) a feed mixture of 221 grams of L-5 Fatty Acid (a tall oil fatty acid composition commercially available from Westvaco Corporation), 220.6 grams of Rosin SS (a tall oil rosin composition commercially available from Westvaco Corporation), 316.1 grams of styrene, 316.1 grams of (alpha)methyl styrene, 397.4 grams of acrylic acid, and 28.8 grams of di-tert-butyl peroxide into a reactor heated to a temperature of 160° C. The resulting rosin-fatty acid vinylic polymer had a molecular weight of 10,350.

A solution which can be employed as a paper sizing composition may be prepared by mixing 51% (by total weight of the solution) of Polymer No. 13, 2% of a dicarboxylic rosin sodium salt, 1% of potassium chloride, 46% deionized water, and a neutralizing amount of potassium hydroxide in a blender.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A rosin-fatty acid vinylic polymer surface sizing composition prepared by the process of:
   (A) reacting in an addition polymerization reaction:
      (1) about 20.0% to about 60.0% by total weight of the reactants of a fatty acid rosin mixture comprising:
         (a) about 10.0% to about 90.0% by total weight of the mixture of fatty acid, and
         (b) about 10.0% to about 90.0% by total weight of the mixture of rosin; and
      (2) about 40.0% to about 80.0% by total weight of the reactants of a monomer mixture comprising:
         (a) about 15.0% to about 45.0% by total weight of the mixture of a member selected from the group consisting of acrylic acid, methacrylic acid, fumaric acid, maleic anhydride, and combinations thereof,
         (b) about 55.0% to about 85.0% by total weight of the mixture of a member selected from the group consisting of vinylic monomers and combinations thereof,
         (c) about 0.5% to about 5.0% by total weight of the mixture of a polymerization initiator,
         (d) up to about 4.0% by total weight of the mixture of a chain transfer agent, and
         (e) up to about 30% by total weight of the mixture of a hydrocarbon solvent, at a temperature in the range of about 135° C. to about 175° C. to produce a rosin-fatty vinylic polymer having a weight average molecular weight in the range of about 4,000 to about 12,000; and
   (B) dispersing the rosin-fatty vinylic polymer in water; to produce the surface sizing composition.

2. The rosin-fatty acid vinylic polymer surface sizing composition of claim 1 prepared by the process of:
   (A) reacting in an addition polymerization reaction:
      (1) about 20.0% to about 60.0% by total weight of the reactants of a fatty acid rosin mixture comprising:
         (a) about 20.0% to about 50.0% by total weight of the mixture of fatty acid, and
         (b) about 50.0% to about 80.0% by total weight of the mixture of rosin; and
      (2) about 40.0% to about 80.0% by total weight of the reactants of a monomer mixture comprising:
         (a) about 20.0% to about 25.0% by total weight of the mixture of a member selected from the group consisting of acrylic acid, methacrylic acid, fumaric acid, maleic anhydride, and combinations thereof,
         (b) about 60.0% to about 70.0% by total weight of the mixture of a member selected from the group consisting of vinylic monomers and combinations thereof,
         (c) about 1.0% to about 3.0% by total weight of the mixture of a polymerization initiator,
         (d) about 0.5% to about 2.0% by total weight of the mixture of a chain transfer agent, and
         (e) about 1.0% to about 4.0% by total weight of the mixture of a hydrocarbon solvent;
   at a temperature in the range of about 135° C. to about 175° C. to produce a rosin-fatty vinylic polymer having a weight average molecular weight in the range of about 4,000 to about 12,000; and
   (B) dispersing the rosin-fatty vinylic polymer in water; to produce the surface sizing composition.

3. The surface sizing composition of claim 1 wherein the fatty acid is a member selected from the group consisting of fatty acids containing from 12 to 24 carbon atoms and combinations thereof.

4. The surface sizing composition of claim 1 wherein the rosin is a member selected from the group consisting of tall oil rosin, wood rosin, gum rosin, and combinations thereof.

5. The surface sizing composition of claim 1 wherein the vinylic monomer is a member selected from the group consisting of styrenic monomers, acrylic monomers, methacrylic monomers, and combinations thereof.

6. The surface sizing composition of claim 1 wherein the vinylic monomer is a mixture containing at least one monoalkenyl aromatic monomer and at least one acrylic monomer.

7. The surface sizing composition of claim 6 wherein the monoalkenyl aromatic monomer is a member selected from the group consisting of alpha-methyl styrene, styrene, vinyl toluene, tertiary butyl styrene, ortho-chlorostyrene, and combinations thereof.

8. The surface sizing composition of claim 6 wherein the acrylic monomer is a member selected from the group consisting of methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, methyl acrylate, ethyl acrylate, n-propyl acrylate, isopropyl acrylate, n-butyl acrylate, n-decyl acrylate, acrylic acid and its salts, acrylonitrile, acrylamide, methyl alpha-chloroacrylate, methyl 2-cyanoacrylate, N-ethylacrylamide, N,N-diethylacrylamide, acrolein, and combinations thereof.

9. The surface sizing composition of claim 1 wherein the polymerization initiator is a member selected from the group consisting of t-butyl peroxide, t-butyl peroxybenzoate, t-butyl peroctoate, cumene hydroperoxide, azobisisobutyronitrile, benzoyl peroxide, and combinations thereof.

10. The surface sizing composition of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

11. The surface sizing composition of claim 1 wherein the hydrocarbon solvent is a member selected from the group consisting of aromatic solvents, aliphatic solvents, and combinations thereof.

12. The surface sizing composition of claim 1 wherein the addition polymerization reaction occurs at a temperature in the range of about about 140° C. to about 170° C.

13. The surface sizing composition of claim 1 wherein the rosin-fatty vinylic polymer has a weight average molecular weight in the range of about 5,000 to about 11,000.

14. The surface sizing composition of claim 1 wherein the composition has an acid number from about 50 to about 500.

15. The surface sizing composition of claim 1 wherein the composition has an acid number from about 50 to about 250.

* * * * *